US007625436B2

(12) United States Patent
Paling et al.

(10) Patent No.: US 7,625,436 B2
(45) Date of Patent: Dec. 1, 2009

(54) AIR DRYER CARTRIDGE

(75) Inventors: Mark Paling, Leeds (GB); Ignitius Milomo, Bradford (GB); Stephan Niemeyer, Ludwigsburg (DE); Andrew G. L. Blackwood, Shipley (GB)

(73) Assignee: Wabco GmbH & Co. OHG, Hannover (DE)

( * ) Notice: Subject to any disclaimer, the term of this patent is extended or adjusted under 35 U.S.C. 154(b) by 310 days.

(21) Appl. No.: 10/556,551

(22) PCT Filed: Jun. 25, 2004

(86) PCT No.: PCT/GB2004/002769

§ 371 (c)(1),
(2), (4) Date: Mar. 9, 2007

(87) PCT Pub. No.: WO2005/000448

PCT Pub. Date: Jan. 6, 2005

(65) Prior Publication Data

US 2007/0180999 A1     Aug. 9, 2007

(30) Foreign Application Priority Data

| Jun. 25, 2003 | (GB) | ................................. 0314829.3 |
| Sep. 15, 2003 | (DE) | ................................. 103 42 871 |
| Feb. 4, 2004 | (GB) | ................................. 0402485.7 |

(51) Int. Cl.
*B01D 53/02*   (2006.01)

(52) U.S. Cl. .............................. 96/134; 55/392; 55/428; 55/423; 55/486; 55/DIG. 17; 96/135; 96/147

(58) Field of Classification Search .................. 96/134, 96/135, 147; 55/392, 428, 485, 486, DIG. 17, 55/423
See application file for complete search history.

(56) References Cited

U.S. PATENT DOCUMENTS

| 3,464,186 A | 9/1969 | Hankison et al. |
| 3,796,025 A | 3/1974 | Kasten |
| 3,891,417 A | 6/1975 | Wade |
| 4,468,239 A * | 8/1984 | Frantz .......................... 96/114 |
| 4,564,376 A * | 1/1986 | Billiet .......................... 55/486 |

(Continued)

FOREIGN PATENT DOCUMENTS

DE      OS 1 619 872      2/1971

(Continued)

OTHER PUBLICATIONS

International Search Report PCT/6B2004/002769 mailed Sep. 30, 2004.

*Primary Examiner*—Duane Smith
*Assistant Examiner*—Christopher P Jones
(74) *Attorney, Agent, or Firm*—Nixon Peabody LLP; Jeffrey L. Costellia

(57) ABSTRACT

An air dryer cartridge (10) is provided with an inlet connectable to a compressed air source, an outlet connectable to a reservoir and a desiccant (18) provided intermediate the inlet and outlet adapted to remove moisture from air passing through the air dryer cartridge (10), wherein the air dryer cartridge (10) further includes a filter (20) to capture oil droplets present in air received from the source, and wherein further the filter (20) is positioned downstream of the desiccant (18).

26 Claims, 6 Drawing Sheets

U.S. PATENT DOCUMENTS

| | | | |
|---|---|---|---|
| 5,110,330 A | 5/1992 | Loughran | |
| 5,423,129 A | 6/1995 | Castle et al. | |
| 5,427,609 A | 6/1995 | Zoglman et al. | |
| 5,662,727 A | 9/1997 | Castle et al. | |
| 6,484,413 B1 | 11/2002 | Larsson | |
| 6,581,297 B1 * | 6/2003 | Ginder | 34/79 |

FOREIGN PATENT DOCUMENTS

| | | |
|---|---|---|
| DE | 2 141 084 | 10/1972 |
| DE | 691 24 494 T2 | 5/1997 |
| DE | 103 13 575 A1 | 9/2004 |
| EP | 1 048 540 A1 | 11/2000 |
| EP | 1 048 541 A1 | 11/2000 |
| GB | 1 136 052 A | 12/1968 |
| GB | 1136052 | 12/1968 |
| WO | WO 01/26783 A1 | 4/2001 |
| WO | WO 01/52973 A1 | 7/2001 |
| WO | WO 02/074422 A1 | 9/2002 |
| WO | WO 2004/103509 A2 | 12/2004 |

* cited by examiner

AIR DRYER CARTRIDGE

BACKGROUND OF THE INVENTION

1. Field of the Invention

The present invention relates to a vehicle air dryer and in particular to a vehicle air dryer desiccant cartridge.

2. Description of the Related Art

The provision of air drying apparatus, hereinafter referred to as an air dryer, in vehicle air systems is well known. The air dryer apparatus is typically positioned intermediate of the air source, for example a compressor, and a reservoir. The air dryer includes a desiccant material, for example a moisture adsorbing material such as silica gel, which removes moisture from the air supplied by the compressor so as to prevent said moisture being deposited downstream in the vehicle air system where it may over time damage components of the air system. So as to address the build up of moisture in the desiccant material the air dryer is periodically purged to atmosphere with dry air from the reservoir. Purging of the desiccant is typically undertaken during periods when the compressor is idle and no significant demands for dry air are being made of the reservoir. The desiccant material is typically provided in a removable canister, hereinafter referred to as a cartridge, which is releasably attached to the air dryer. The cartridge is periodically replaced so as to take into account reduction in the performance of the desiccant material over time.

It is not unknown for the air supplied by the compressor to include a mist of very fine oil droplets. The oil droplets are generated from the lubricating oil present in the compressor by the reciprocating action of the compressor. The oil mist typically passes through the air dryer and subsequently to the vehicle air system. Some oil mist will be deposited in the reservoir. While oil deposited in this manner is much less likely to damage air system components in the same manner as moisture, its deposit may lead over time to such problems as, for example, the constriction of narrow passageways in air system components and the degradation of elastomeric seals. It is an object of the present invention to provide an improved air dryer which seeks to prevent the transmission of oil therethrough.

SUMMARY OF THE INVENTION

According to the present invention there is provided an air dryer cartridge having an inlet connectable to a compressed air source, an outlet connectable to a reservoir and a desiccant provided intermediate the inlet and outlet adapted to remove moisture from air passing through the air dryer, wherein the air dryer further includes a coalescing means adapted to coalesce oil droplets present in air received from the source, and wherein the coalescing is positioned downstream of the desiccant.

The term downstream will be construed with reference to the flow of air from the compressed air source. The coalescing means acts to separate oil mist from the air and substantially prevent oil mist and particulate matter from entering an air system provided downstream of the air dryer. The coalescing means serves to entrap droplets forming the oil mist and form them into droplets of a larger size which can separated from the airflow and hence cannot be carried by the airflow through the cartridge.

In a preferred embodiment the coalescing means and desiccant are contained within a removable cartridge of the air dryer. The coalescing means and desiccant may be arranged such that the desiccant is mounted over the coalescing means.

It will be appreciated that in such an arrangement the coalescing means is positioned at or near the base of the cartridge and which base is utlilised to secure the cartridge to the body of an air dryer. Preferably the coalescing means and desiccant are positioned directly adjacent to one another. The coalescing means and desiccant may be in contact with one another.

The coalescing means may comprise a plurality of filter elements. Each filter element may comprise a layer or sheet of a filter media material. The characteristics of the layers of filter media material may be substantially uniform. In an alternative embodiment the filter media layers may have differing characteristics depending upon the service requirements of the air dryer. The material of the filter media is preferably adapted to temporarily retain oil captured thereby in liquid form. In such an embodiment the liquid oil may advantageously be removed from the filter during regeneration of the desiccant by the reverse flow of dry air through the air dryer. The oil may be temporarily retained on the surface of the material of the filter media, within the material of the filter media or both on the surface and within the material of the filter media.

In a preferred embodiment the filter media are sandwiched between outer permeable barrier layers. The barrier layers may comprise a synthetic fleece material. The filter may advantageously be provided in the form of a subassembly comprising a housing within which the filter media material is retained. The housing may comprise a permeable base and a permeable retaining member fittable to the base to retain the filter media material therebetween. The base may be provided with one or more apertures. The retaining member may also be provided with one or more apertures. The housing may additionally be provided with a seal around its periphery.

The cartridge may optionally be provided with a a sump to collect oil entrained by the coalescing means. The sump many be provided with a drain to allow any oil collected therein to be removed therefrom. The drain may advantageously be provided with a flow control mechanism so as to allow the sump to be emptied under predetermined fluid flow conditions through the cartridge. For example the drain may be provided with a non-return valve operable permit emptying of the sump during regeneration flow through the cartridge.

BRIEF DESCRIPTION OF THE DRAWINGS

Embodiments of the present invention will now be described with reference to the accompanying drawings in which:

Referring now to FIG. 1 there is shown a simplified cross-sectional desiccant cartridge, generally designated 10, according to the present invention. The cartridge 10 comprises a base 12 and a casing 14 defining therebetween a cavity 16. Disposed within the cavity 16 is a desiccant matrix 18 comprising a moisture adsorbing material such as silica gel pellets, and an oil coalescing assembly 20. The moisture adsorbing material may comprise a homogenous adsorbing material having uniform adsorption characteristics. Alternatively the moisture adsorbing material may comprise a plurality of layers having differing adsorption characteristics. The oil coalescing assembly 20 comprises a plurality of substantially circular sheets of filter paper. The desiccant matrix 18 and oil coalescing assembly 20 are housed within a container 22 within the cavity 16, which container 22 is defined by the base 12 and an upstanding peripheral wall 24 thereof. The base 12 is further provided with a centrally positioned aperture 26. The desiccant matrix 18 is positioned above the oil coalescing assembly 20 such that the coalescing assembly 20 is lowermost and adjacent the base 12. Intermediate the desiccant matrix 18 and the coalescing assembly 20 is a permeable barrier 32. The barrier 32 functions to prevent the desiccant matrix 18 from coming into contact with the oil coalescing assembly 20 and vice versa and thereby prevents the possible damage to the filter paper layers by the material comprising the desiccant matrix 18. The barrier may be defined by a layer of a synthetic fleece material.

Figure 1:
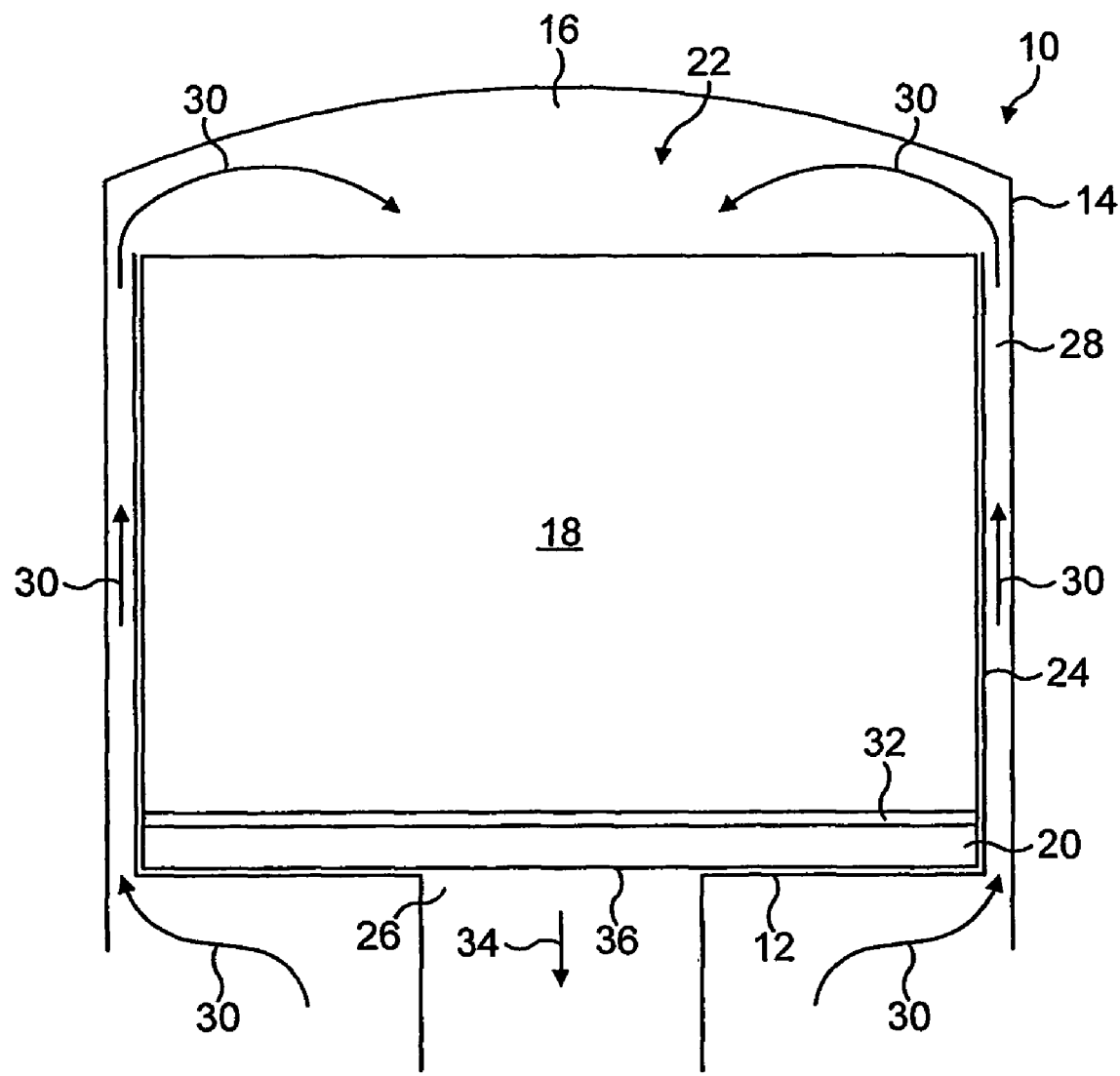
FIG. 1 shows a diagrammatic cross-sectional view of an air dryer cartridge according to the present invention.

The container 22 is sized such that it is received within the casing 14 with an annular space 28. In use the cartridge 10 is attached to the body of an air dryer apparatus (not shown) such that incoming moist air and oil mist from a compressor is directed into the cartridge 10 through the annular space 28 as indicated by arrows 30. The air and oil mist then passes through the desiccant matrix 18 whereupon the moisture is removed from the air in a conventional manner. The oil mist is not removed by contact with the desiccant matrix 18 in the same manner as moisture, however a small amount of the oil mist may adhere to the surface of the moisture adsorbing material and hence may reduce its efficiency. The majority of the oil mist is conveyed with the now dry air through the fleece barrier 32 to the oil coalescing assembly 20. As will be described in greater detail below the oil coalescing assembly 20 removes the majority of the oil mist entrained with the dry air and thereby ensures that air which is substantially moisture free and substantially oil free exits the cartridge via the base aperture 26 as indicated by arrow 34. The cleaned and dried air then passes through the body of the air dryer apparatus and onwards to a reservoir (not shown).

The oil coalescing assembly 20 acts to remove the oil mist by coalescing the individual droplets forming the mist into larger droplets which are not carried by the air stream passing through the oil coalescing assembly 20 and out of the cartridge 10 via the base aperture 26. These larger droplets are temporarily retained on the fibres of the filter paper layers comprising the oil coalescing assembly 20. The filter paper material is chosen such that the oil droplets are not absorbed thereby and hence are capable of being removed.

As described in the introductory paragraphs above, the desiccant material of the cartridge requires to be periodically regenerated with dry air to prevent it from becoming saturated with moisture and hence rendered ineffective. The flow of regenerative dry air through the cartridge is in the direction opposite to that shown for moist air and oil mist. Dry regeneration air from the reservoir enters the cartridge 10 through the base aperture 26 before entering the oil coalescing assembly 20. As can be seen from FIG. 1 the underside 36 of the oil coalescing assembly 20 is spaced slightly from the base 12 so as define a gap therebetween. The presence of the gap ensures that the entire underside 36 of the oil 20 is exposed to the regeneration flow. As the dry air passes through the oil coalescing assembly 20 it entrains at least some the coalesced oil droplets retained on the fibres of the filter paper. The aforementioned oil droplets are carried by the regeneration air through the desiccant matrix 18 and are vented with the now moist regeneration air to atmosphere. The desiccant matrix 18 and oil coalescing assembly 20 are therefore recharged and ready to accept the next charge of moist air and oil mist from the compressor when it next comes on load.

Figure 2:
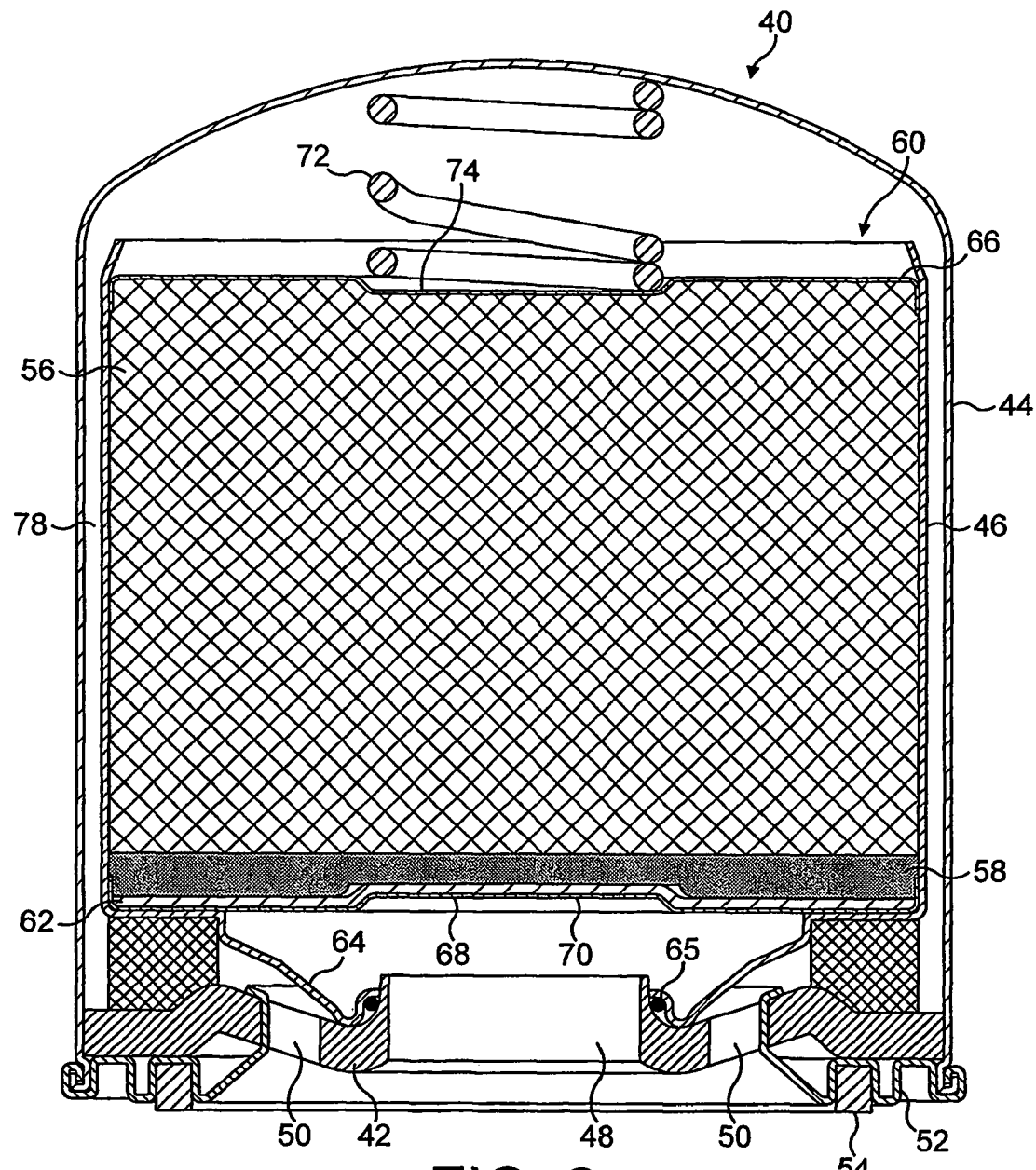
FIG. 2 shows a more detailed cross-sectional view of an air dryer cartridge constructed in accordance with the principles described with reference to FIG. 1.

FIG. 2 shows a cross-sectional view of an actual desiccant cartridge, generally designated 40, which is constructed in accordance with the principles described with reference to FIG. 1. The cartridge 40 includes a base member 42, a casing 44 and an inner container 46. The base member 42 is provided with a central aperture 48 surrounded by a plurality of secondary apertures 50. The central aperture 48 is threaded (not shown) in order that the cartridge 40 as a whole can be screw fitted to a complementary threaded spigot of an air dryer housing. The base member 42 is further provided with an annular seal mount 52 which carries an elastomeric seal 54. The seal 54 ensures that, in use, the cartridge 40 fits in a leak tight manner to an air dryer housing.

Within the inner container 46 there is provided a desiccant matrix 56 and an oil coalescing assembly 58. The desiccant matrix 56 comprises a moisture adsorbing material such as silica gel pellets, while the oil coalescing assembly 58 comprises a plurality of layers of filter paper. As before the moisture adsorbing material may comprise a homogenous adsorbing material having uniform adsorption characteristics, or a plurality of layers having differing adsorption characteristics The filter paper layers are in turn sandwiched between upper and lower fleece layers. The inner container 46 is essentially tubular having a main portion 60 of substantially uniform diameter within which the desiccant matrix 56 and oil coalescing assembly 58 are provided. An annular seat 62 is provided at the base of the main portion 60 upon which the desiccant matrix 56 and oil coalescing assembly 58 are supported, in use. The lower portion 64 of the container 46 defines an annular foot which rests against an annular seal 65 disposed between the foot and the base member 42. The desiccant matrix 56 and oil coalescing assembly 58 are enclosed in the container 46 by a lid 66 and a base 68. Both the lid 66 and the base 68 are perforated so as to permit the passage of air therethrough. The base 68 rests on the seat of the container 46 and thereby prevents the desiccant matrix 56 and oil coalescing assembly 58 from falling onto the lower portion 64 of the container 46. An indentation 70 is provided in the centre of the base 68.

In order to retain the interior components of the cartridge 40 in their desired locations a spring 72 is provided between the casing 44 and the lid 66. The downward pressure exerted by the spring 72 serves to both urge the desiccant matrix 56 and oil coalescing assembly 58 against the base 68 and to urge the container 46 against an annular pre-filter 76 which in turn is urged against the base member 42. The spring is located in a recess 74 of the lid 66. A further feature of the cartridge 40 is the provision of the annular pre-filter 76. The pre-filter 76 is located between the base member 42 and the container 46 and serves to prevent particulate matter such as dust from reaching the desiccant matrix 56.

In use the cartridge 40 is attached to the body of an air dryer apparatus (not shown) such that incoming moist air and oil mist from a compressor is directed into the cartridge 40 through the secondary apertures 50. The moist air and oil mist first passes through the pre-filter 76 before reaching an annular space 78 defined between the casing 44 and the container 46. The air and oil mist is conveyed through the annular space 78 before passing through the desiccant matrix 56 whereupon the moisture is removed from the air in a conventional manner. The vast majority of the oil mist is not removed by contact with the desiccant matrix 56 and hence is conveyed with the now dry air through the upper fleece layer to the filter paper layers of the oil coalescing assembly 58. As described above in relation to the previously described embodiment a small proportion of the oil mist may coat the moisture adsorbing material of the desiccant matrix 56. As will be described in greater detail below the oil coalescing assembly 58 removes the majority of the oil mist entrained with the dry air and thereby ensures that air that is substantially moisture and oil free exits the cartridge via the central aperture 48. The cleaned and dried air then passes through the body of the air dryer apparatus and onwards to a reservoir (not shown).

The oil coalescing assembly 58 acts to remove the oil mist by coalescing the individual droplets forming the mist into larger droplets which are not carried by the air stream passing through the oil coalescing assembly 58 and out of the cartridge 40 via the central aperture 48. These larger droplets are temporarily retained on the fibres of the filter paper layers comprising the oil coalescing assembly 58. The filter paper material is chosen such that the oil droplets are not absorbed thereby and hence are capable of being removed in the manner to be described below.

As described in the introductory paragraphs above, the desiccant material of the cartridge requires to be periodically regenerated with dry air to prevent it from becoming saturated with moisture and hence rendered ineffective. The flow of regenerative dry air through the cartridge is in the direction opposite to that shown for moist air and oil mist. Dry regeneration air from the reservoir enters the cartridge 40 through the central aperture 48 before entering the oil coalescing assembly 58. As the dry air passes through the oil coalescing assembly 58 it entrains the at least some of the coalesced oil droplets retained on the fibres of the filter paper. The oil droplets are carried by the regeneration air through the desiccant matrix 56 and are vented with the now moist regeneration air to atmosphere. The desiccant matrix 56 and oil coalescing assembly 58 are therefore recharged and ready to accept the next charge of moist air and oil mist from the compressor when it next comes on load.

Figure 3:
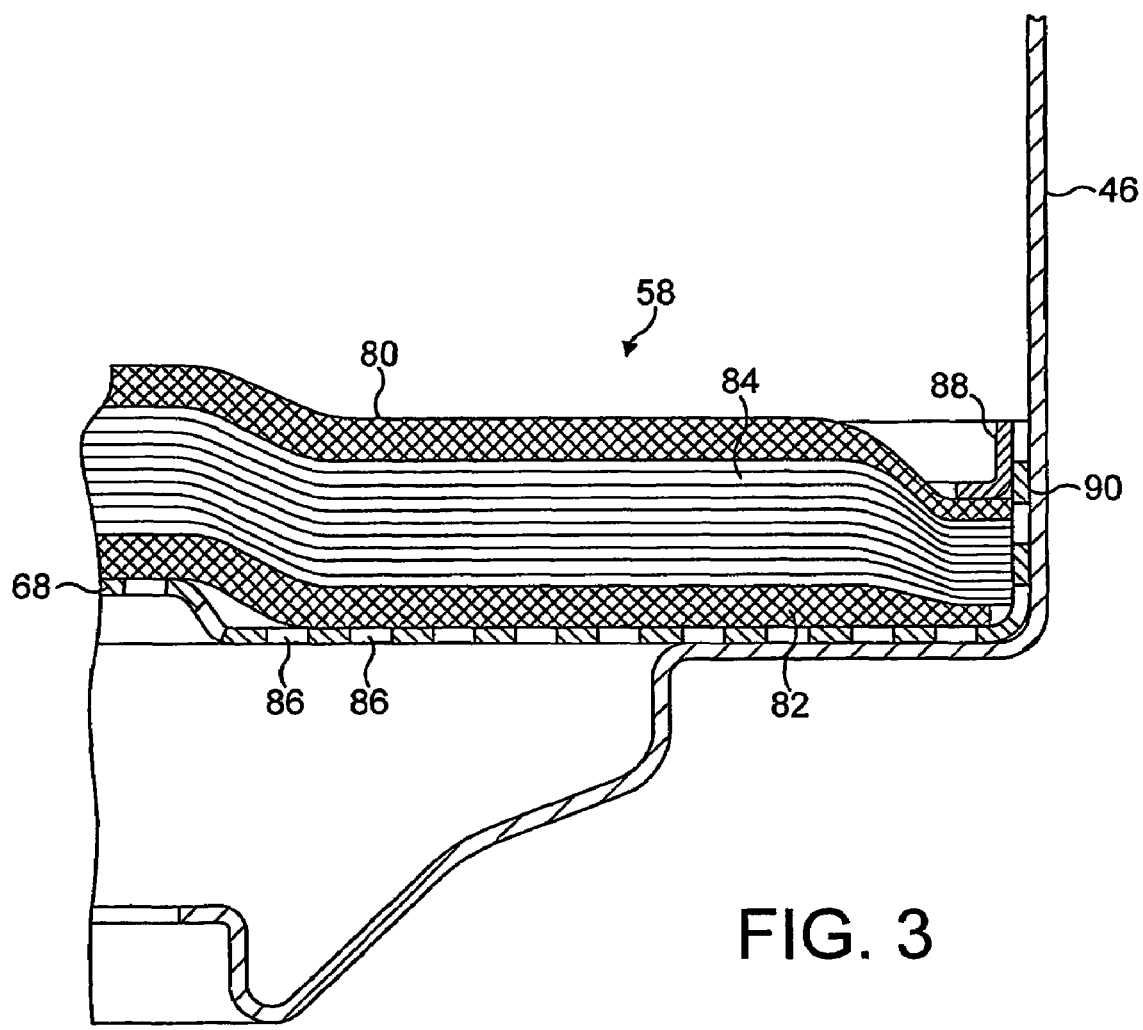
FIG. 3 shows a partial cross-sectional view of an oil coalescing assembly arrangement.

Referring now to FIG. 3 there is shown a partial cross-sectional view of the oil coalescing assembly 58. As described above the oil coalescing assembly 58 comprises upper and lower fleece layers 80,82 and an intermediate plurality of filter paper layers 84. The upper fleece layer 80 prevents the material of the desiccant matrix 56 coming into contact with the filter paper layers 84 and being damaged thereby. The lower fleece layer 82 prevents the filter paper layers 84 from coming into contact with the perforations 86 of the base 68 so as to prevent the lowermost filter paper layers being cut or torn by the perforations 86. The oil coalescing assembly 58 is formed as a sub assembly or cassette with the fleece and filter paper layers 80,82,84 being retained in the base 68 by a clamp ring 88 which is gripped by an upstanding wall 90 of the base 68. It will be appreciated therefore that the oil coalescing assembly 58 can be pre-assembled prior to the assembly of the cartridge 40 as a whole and hence reduces the complexity and time required to assemble the cartridge. In the embodiment shown both the inner container 46 and base 68 are made from metal. Advantageously the diameters to the container 46 and base 68 are such that base 68 has a slight interference fit with the container and hence is gripped thereby.

Figure 4:
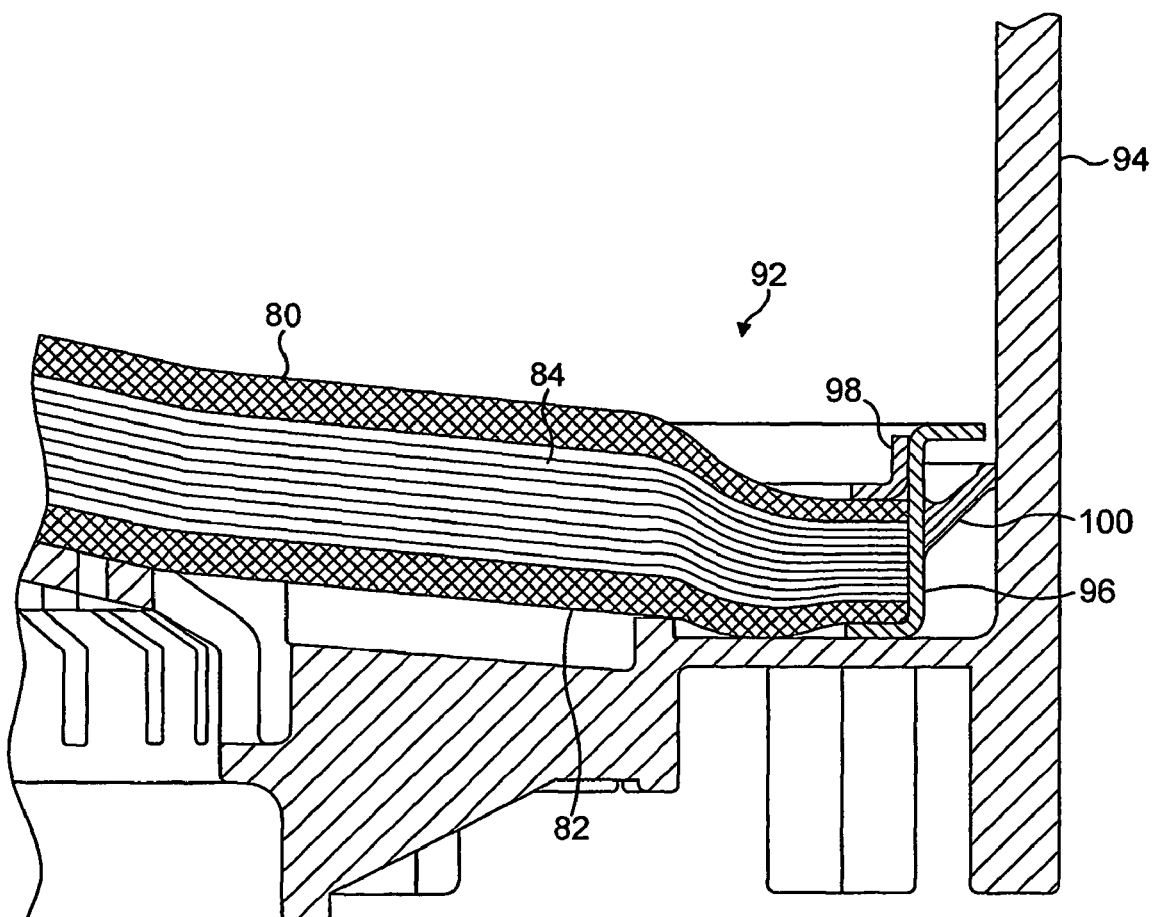
FIG. 4 shows a partial cross-sectional view of an alternative oil coalescing assembly arrangement.

FIG. 4 shows an alternative embodiment of an oil coalescing assembly, generally designated 92. As before the oil coalescing assembly 92 comprises upper and lower fleece layers 80,82 and an intermediate plurality of filter paper layers 84. In this embodiment however the container 94 is moulded from a plastics material as opposed to being formed from metal. As such, it is possible to mould a perforated base integrally with the container 94 and thereby dispense with the need for a separate perforated base which has to be fitted to the container 94. The use of a plastic container 94 also prevents the use of an interference fit between the container 94 and the oil coalescing assembly 92 as this may result in damage to the container 94 during fitting of the oil coalescing assembly 92. Additionally the grip afforded by such an interference fit may deteriorate over time due to creep of the plastics material.

To accommodate the use of a plastics material for the container 94, the fleece and filter paper layers 80,82,84 are retained in association with one another by an annular base ring 96 and a clamp ring 98. The base ring 96 has an outer diameter less than that of the container 94 and requires a peripheral elastomeric sealing lip 100 to prevent air flow being able to bypass the oil coalescing assembly 92.

Figure 5:
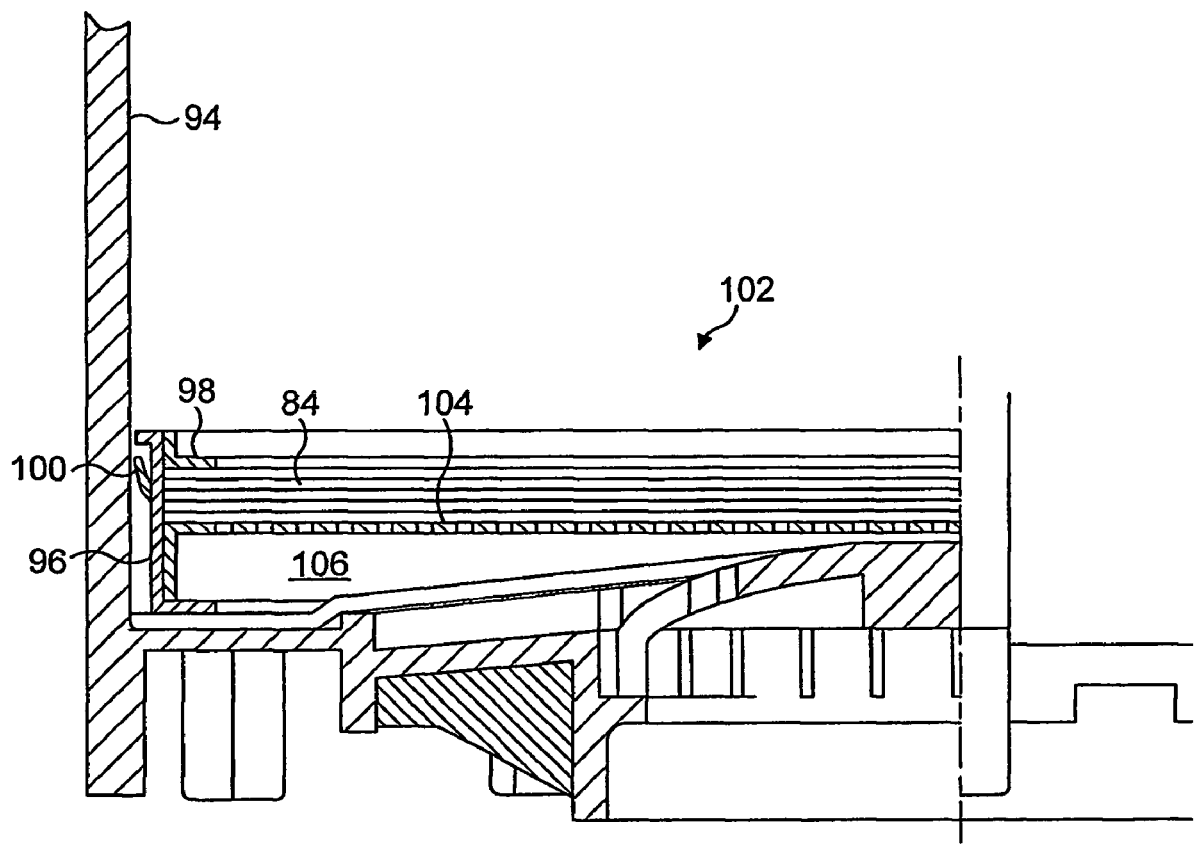
FIG. 5 shows a partial cross-sectional view of a further alternative oil coalescing assembly arrangement.

FIG. 5 shows another oil coalescing assembly, generally designated 102, which is adapted for use with a plastic container 94. Features common to the embodiment described with reference to FIG. 4 are identified with like reference numerals. The embodiment of FIG. 5 differs in that a flat perforated floor 104 which supports the filter paper layers 84 is provided between the annular base ring 96 and the clamp ring 98. The floor 104 serves to elevate the filter paper layers 84 above the base of the container 94 and prevents them from being conformed to the shape of the container base. The floor 104 further provides a space 106 underneath the oil coalescing assembly 92 which allows the full diameter of the coalescing assembly 102 to be exposed to regeneration flow. Optionally, additional filtration means may be sited within the space 160 if required.

Figure 6:
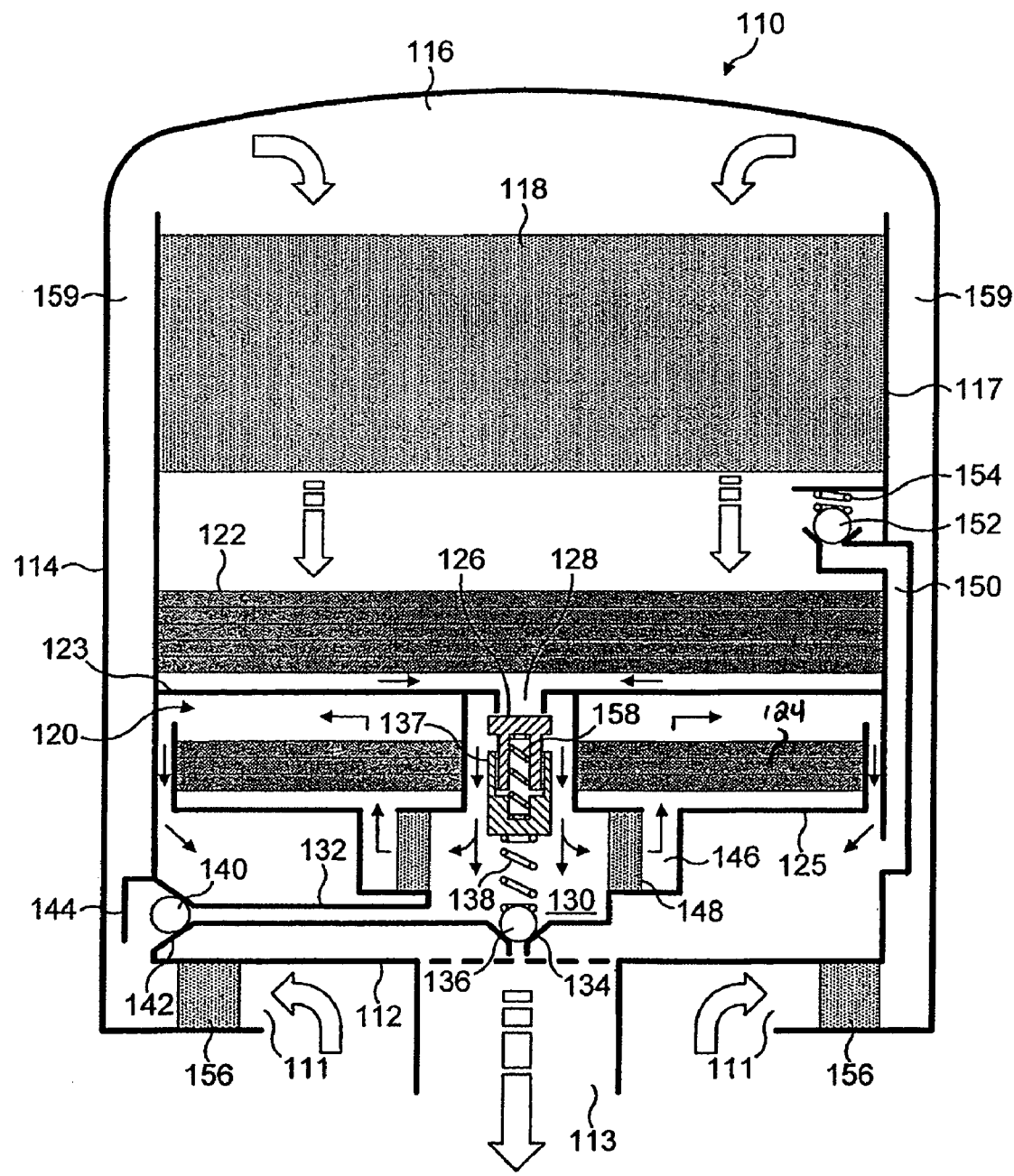
FIG. 6 shows a diagrammatic cross-sectional side view of an alternative embodiment of the present invention.

Referring now to FIG. 6 there is shown a desiccant cartridge, generally designated 110, according to the present invention. The cartridge 110 comprises a base 112 and a casing 114 defining therebetween a cavity 116. Disposed within the cavity 116 is a housing 117 containing a desiccant matrix 118 and an oil coalescing assembly 120. The desiccant matrix 118 is positioned above the oil coalescing assembly 120 such that incoming air passes through the desiccant matrix 118 before the oil coalescing assembly 120. The cartridge 110 is provided with an inlet 111 to allow the admission of air from a compressor and an outlet 113 to permit dried and filtered air to exit the cartridge 110.

The oil coalescing assembly 120 includes a first filter bed 122, a second filter bed 124 disposed in a separate chamber of the housing 117, and a non return valve 126 positioned between the filter beds 122, 124. The filter beds 122,124 are of a similar construction to those described in the first embodiment and are spaced from respective floor portions 123, 125 of the housing 117 so as to ensure that the maximum possible filter area is exposed to the air flow through the cartridge 110. The oil coalescing assembly 120 further includes a first sump 128 positioned below the first filter bed 122 and above the non-return valve 126, and a second sump 130 positioned below the non-return valve 126. The second sump 130 is provided with a drain passage 132 which extends to the exterior of the housing 117 and a regeneration inlet 134 which enables regeneration flow to enter the second sump 130. The regeneration inlet 134 is closed by a ball 136 and spring 138 arrangement which acts against a fixed rigid housing 137. This housing 137 also receives and locates the non-return valve 126 and associated spring 158. The drain passage 132 is also closed by a ball member 140. The ball member 140 is retained in associate with the outlet 142 of the drain passage 132 by a resilient means such as an elastomeric band 144 extending around the housing 117.

A flow passage 146 is provided between the second sump 130 and the second filter bed 124 so as to allow air to reach the second filter bed 124. The inlet of the flow passage 146 is provided with a barrier 148 which permits air to pass therethrough but substantially prevents the passage of any liquid which may be present in the second sump 130. The housing 117 is further provided with a regeneration flow passage 150 which, in use, permits regeneration flow to bypass the oil coalescing assembly 120 and be directed to the desiccant matrix 118. The regeneration flow passage 150 includes a non-return valve having a ball 152 and a spring 154.

Operation of the cartridge 110 will now be described. Moist air contaminated with oil mist is received from the compressor at the inlet 111. A particle filter 156 is provided at the inlet 111 which serves to trap any large particles carried along in the air stream. The particles may comprise, for example, dust drawn in through the compressor inlet. Once past the particle filter the moist air contaminated with oil mist is directed through the annular space 159 defined between the housing 117 and the casing 114 to the cavity 116. The air then flows through the desiccant matrix 118 whereupon the moisture is removed in a conventional manner. A very minor proportion of the oil may also be removed due to coating of the desiccant material.

The now dried oil bearing air then passes to the first filter bed 122 whereupon the vast majority of the oil is removed. The filter bed 122 acts to remove the oil mist by coalescing the individual droplets forming the mist into larger droplets which are not carried by the air stream passing through the filter bed 122. These larger droplets are temporarily retained on the fibres of the filter paper layers comprising the filter bed 122 before draining down into the first sump 128. It will be understood that the throughflow of air through the cartridge 110 opens the non-return valve 126 which is normally biased to a closed position by a spring 158. During periods when the compressor is off-load oil droplets within the first filter bed 122 can drain into the first sump 128 where they are held temporarily pending the next compressor on-load period. It will also be appreciated that the non-return valve 154 of the regeneration flow passage 150 prevents the dried air from bypassing the oil coalescing assembly 120.

Having passed through the first filter bed 122 the now substantially oil free air opens the non-return valve 126 and enters the second sump 130 area. As described above, any oil lying in the first sump 122 is able to drain to the second sump 130. The air then passes into the flow passage 146 through the barrier 148 and through the second filter bed 124. The second filter bed 124 is optional and again operates in the same manner as the first filter bed 122. The filter bed 124 acts to remove the oil mist by coalescing the individual droplets forming the mist into larger droplets which are not carried by the air stream passing through the filter bed 124. These larger droplets are temporarily retained on the fibres of the filter paper layers comprising the filter bed 124 before draining down into the second sump 130 during periods when the compressor is off-load. After passing through the second filter bed 124 (where fitted) the substantially moisture and oil free air then exits the cartridge 110 through the outlet 113.

During regeneration of the cartridge 110 dry air enters the cartridge through the inlet 113 and is split into two streams. A first portion enters the second sump 130 via the regeneration inlet 134, while a second portion is directed through the regeneration flow passage 150. The first portion of the regeneration flow urges any liquid retained in the second sump 130 into the drain passage and through the outlet 142 into the annular space 159. The entry of the first portion of the regeneration flow into the second sump 130 also assists in urging the non-return valve 126 to the closed position and thereby preventing the flow from reaching the first filter bed 122. The second portion of the regeneration flow passes through the desiccant matrix 118 and entrains the moisture retained thereby. The now moist regeneration air passes through the annular space 159, whereupon it entrains the liquid ejected from the drain passage outlet 142 by the first portion of the regeneration flow, before exiting the cartridge 110 via the inlet 111.

In the embodiment shown the drain passage 132 leads to the annular space 159 between the housing 117 and the casing 114. In an alternative embodiment the drain passage 132 may extend through the casing 114.

The invention claimed is:

1. An air dryer cartridge having an inlet connectable to a compressed air source, an outlet connectable to a reservoir and a desiccant provided intermediate of the inlet and outlet adapted to remove moisture from air passing through the air dryer, wherein the air dryer cartridge further includes a coalescing means for capturing oil droplets present in air received from the source, and wherein the coalescing means is positioned downstream of the desiccant during a non-regenerative cycle.

2. An air dryer cartridge according to claim 1, wherein the coalescing means and desiccant are arranged such that the desiccant is mounted over the coalescing means.

3. An air dryer cartridge according to claim 1, wherein the coalescing means and desiccant are positioned directly adjacent to one another.

4. An air dryer cartridge according to claim 3, wherein the coalescing means and desiccant are in contact with one another.

5. An air dryer cartridge according to claim 1, wherein the coalescing means comprises a plurality of filter elements.

6. An air dryer cartridge according to claim 5, wherein each filter element comprises a layer of a filter media material.

7. An air dryer cartridge according to claim 6, wherein the characteristics of each of the layers of filter media material are substantially uniform.

8. An air dryer cartridge according to claim 5, wherein the filter elements are sandwiched between outer permeable barrier layers.

9. An air dryer cartridge according to claim 5, wherein the coalescing means is provided in the form of a subassembly comprising a housing within which the filter elements are retained.

10. An air dryer cartridge according to claim 9, wherein the housing comprises a permeable base and a permeable retaining member fittable to the base to retain the filter elements therebetween.

11. An air dryer cartridge according to claim 1, including a sump arranged to collect oil droplets from the coalescing means.

12. An air dryer cartridge according to claim 11, wherein the sump is provided with a drain.

13. An air dryer according to claim 12, wherein the drain includes a non-return mechanism.

14. An air dryer cartridge having an inlet connectable to a compressed air source, an outlet connectable to a reservoir and a desiccant provided intermediate of the inlet and the outlet to remove moisture from air passing through the air dryer, the air dryer cartridge including a base having the inlet and the outlet, and a casing which together with the base, defines a cavity, the air dryer cartridge including a coalescing mean for capturing oil droplets present in air received from the compressed air source, wherein the desiccant and coalescing means are provided within a container provided within the cavity and the coalescing means is positioned downstream of the desiccant, during a non-regenerative cycle, such that compressed air received through the inlet from the compressed air source passes firstly through the desiccant and then through the coalescing means before reaching the outlet.

15. An air dryer cartridge according to claim 14, wherein the coalescing means and desiccant are arranged such that the desiccant is mounted over the coalescing means.

16. An air dryer cartridge according to claim 14, wherein the coalescing means and desiccant are positioned directly adjacent to one another.

17. An air dryer cartridge according to claim 16, wherein the coalescing means and desiccant are in contact with one another.

18. An air dryer cartridge according to claim 14, wherein the coalescing means comprises a plurality of filter elements.

19. An air dryer cartridge according to claim 18, wherein each filter element comprises a layer of a filter media material.

20. An air dryer cartridge according to claim 19, wherein the characteristics of each of the layers of the filter media material are substantially uniform.

21. An air dryer cartridge according to claim 20, wherein the filter elements are sandwiched between outer permeable barrier layers.

22. An air dryer cartridge according to claim 18, wherein the coalescing means is provided in a subassembly comprising a housing within which the filter elements are retained.

23. An air dryer cartridge according to claim 22, wherein the housing comprises a permeable base and a permeable retaining member fittable to the base to retain the filter elements therebetween.

24. An air dryer cartridge according to claim 14, further including a sump arranged to collect oil droplets from the coalescing means.

25. An air dryer cartridge according to claim 24, wherein the sump is provided with a drain.

26. An air dryer cartridge according to claim 25, wherein the drain includes a non-return mechanism.

* * * * *